(12) United States Patent
Sakamoto et al.

(10) Patent No.: US 7,315,643 B2
(45) Date of Patent: *Jan. 1, 2008

(54) THREE-DIMENSIONAL SHAPE MEASUREMENT TECHNIQUE

(75) Inventors: Shizuo Sakamoto, Tokyo (JP); Rui Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 687 days.

This patent is subject to a terminal disclaimer.

(21) Appl. No.: 10/384,639

(22) Filed: Mar. 11, 2003

(65) Prior Publication Data

US 2003/0174880 A1    Sep. 18, 2003

(30) Foreign Application Priority Data

Mar. 12, 2002  (JP)  ............................. 2002-066251

(51) Int. Cl.
  *G06K 9/00*  (2006.01)
(52) U.S. Cl. ...................... 382/154; 382/284; 382/294
(58) Field of Classification Search ................ 382/154, 382/284, 294
  See application file for complete search history.

(56) References Cited

U.S. PATENT DOCUMENTS 5,852,672 A  * 12/1998  Lu .............................. 382/154
6,128,405 A    10/2000  Fujii
6,421,629 B1    7/2002  Ishiyama
6,473,536 B1   10/2002  Chiba et al.
2002/0114509 A1 *  8/2002  Takeuchi et al. ............ 382/154

FOREIGN PATENT DOCUMENTS

| JP | 5-303629 A | 11/1993 |
| JP | 6-241731 | 9/1994 |
| JP | 10-74272 | 3/1998 |
| JP | 2000-155831 | 6/2000 |
| JP | 2000-182059 | 6/2000 |
| JP | 2001-12925 | 1/2001 |
| JP | 2001012925 A * | 1/2001 |
| JP | 2001-84395 A | 3/2001 |

OTHER PUBLICATIONS

Jain, Kasturi, Schunck; "Machine Vision"—Chapter 11 (Depth) Sections 1-3, p. 289-300, 1995.*
Komatsubara et al., "Grating Projection System for Profiling with the Aid of Fringe Scanning Method", *Journal of the Japan Society of Precision Engineering*, 1989, pp. 1817-1822, vol. 55, No. 10.

* cited by examiner

*Primary Examiner*—Bhavesh M Mehta
*Assistant Examiner*—John B Strege
(74) *Attorney, Agent, or Firm*—Foley & Lardner LLP

(57) ABSTRACT

A 3-dimensional measurement method captures a plurality of images of an object from different points of view while shifting a light pattern projected onto the object. A plurality of 3-dimensional in-sight appearances of the object are measured based on the plurality of images. A difference between measured three-dimensional in-sight appearances is corrected to finally synthesize the 3-dimensional appearance of the object.

21 Claims, 10 Drawing Sheets

FIG. 4A (PRIOR ART)
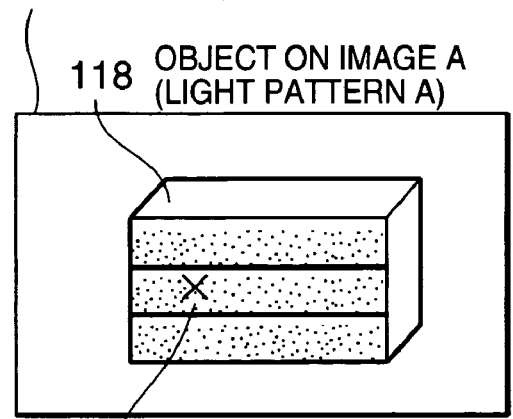
116 IMAGE A (LIGHT PATTERN A)
118 OBJECT ON IMAGE A (LIGHT PATTERN A)
112 POINT P
FIG. 4B (PRIOR ART)
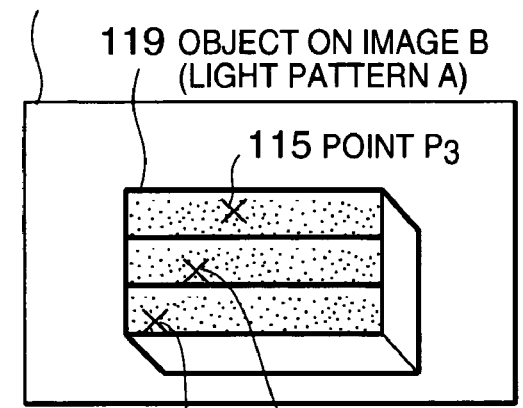
117 IMAGE B (LIGHT PATTERN A)
119 OBJECT ON IMAGE B (LIGHT PATTERN A)
115 POINT $P_3$
114 POINT $P_2$
113 POINT $P_1$
FIG. 4C (PRIOR ART)
115 POINT $P_3$
114 POINT $P_2$
113 POINT $P_1$
203 CAMERA A
204 CAMERA B

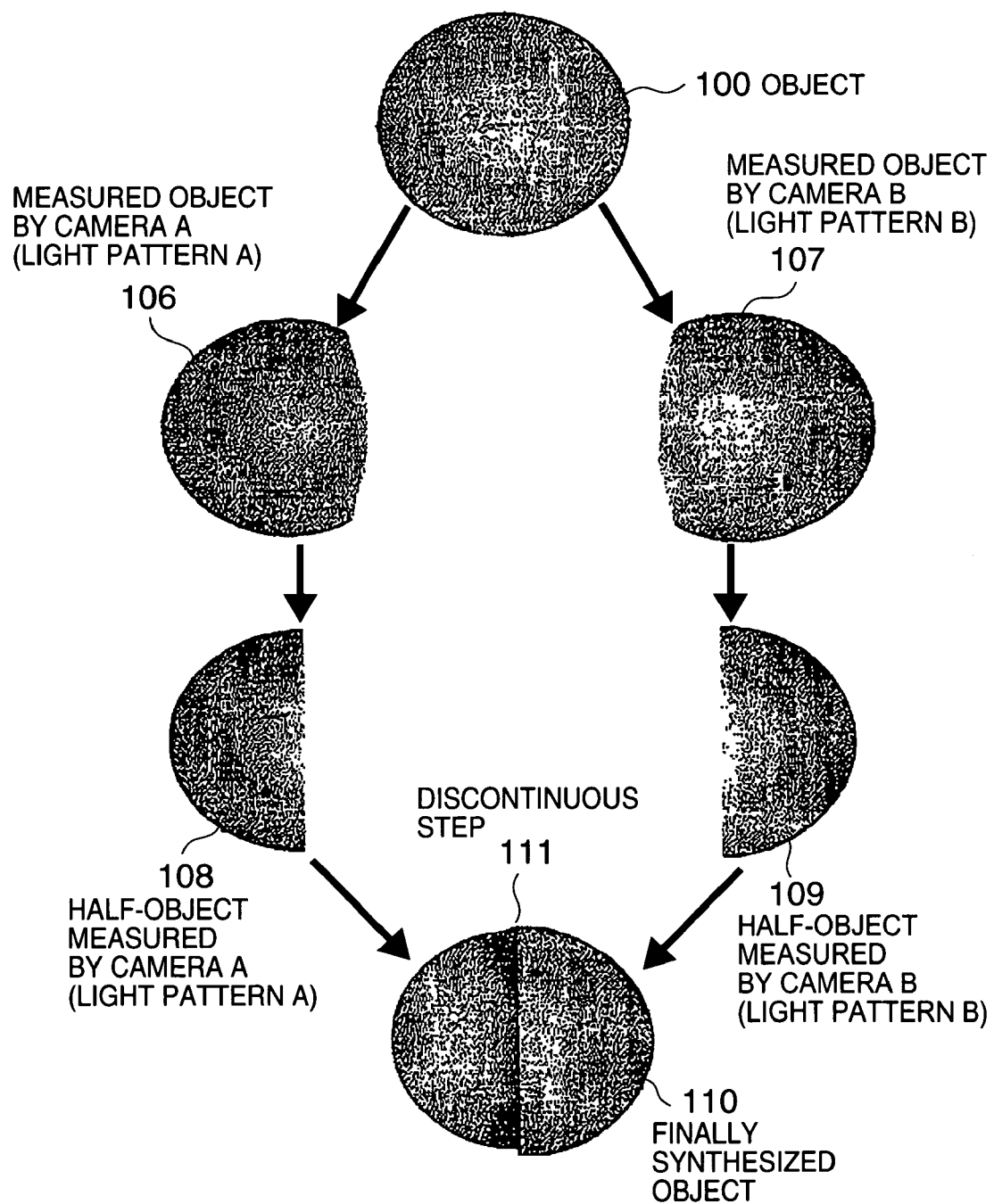

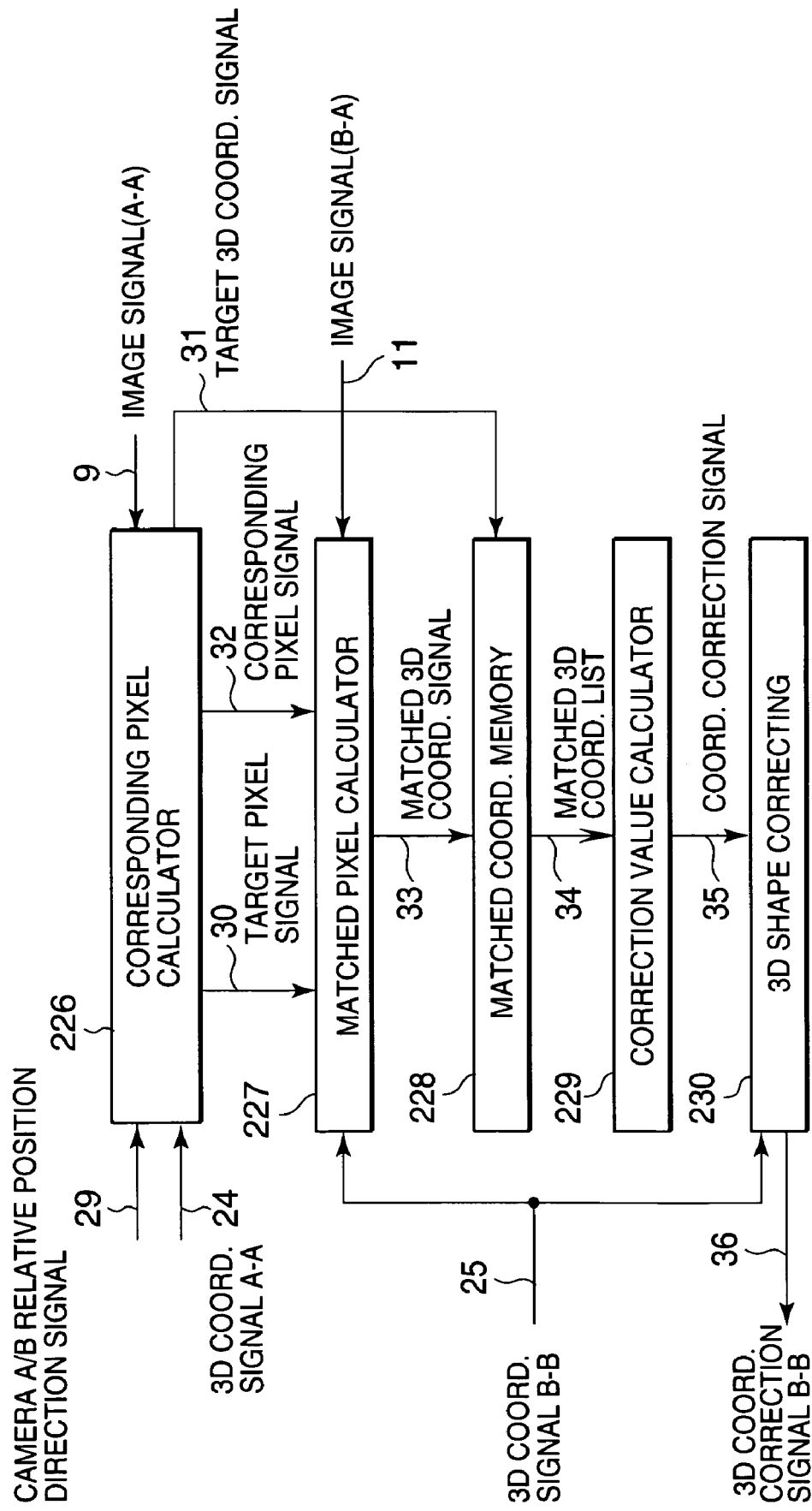

THREE-DIMENSIONAL SHAPE MEASUREMENT TECHNIQUE

BACKGROUND OF THE INVENTION

1. Field of the Invention

The present invention relates to a three-dimensional shape measurement technique and in particular to a method and apparatus for measuring a three-dimensional shape based on a plurality of three-dimensional shapes measured in different directions.

2. Description of the Related Art

There have been proposed a variety of techniques for measuring a three-dimensional shape of an object. As one of such techniques, a sinusoidal pattern projection method, which measuring a three-dimensional shape by projecting a sinusoidal pattern, will be described hereinafter based on Publication (1) entitled: "Grating Projection System for Profiling with the Aid of Fringe Scanning Method" Journal of Precision Engineering (JSPE), vol. 55, No. 10, pp. 1817/1822, 1989.

FIG. 1 shows a schematic diagram of a three-dimensional shape measurement system disclosed in the Publication (1). Referring to FIG. 1, a light pattern having a sinusoidal luminance pattern is projected from a light source 101 on an object 100 through a sinusoidal grating 102 having a gray scale values printed thereon sinusoidally. A point 104 on the object 100 is scanned by a camera 103 to produce image data. Assuming that a coordinate value of the point 104 on an image captured by the camera 103 is denoted by x and a luminance value on the coordinate x is denoted by I(x), the luminance value I(x) is given by the following equation (1):

$$I(x) = A_0(x) + A(x)\cos(\phi + \alpha(x)) \quad (1),$$

where $A_0(x)$ is a bias component, and $\phi$ and $\alpha(x)$ each denote phases.

The image is captured by the camera 103, each time after shifting the grating 102 by a length equal to 1/N of the wavelength of a printed sinusoidal pattern N times, along an axis u, with the object 100 remaining stationary. The captured image appears as if the sinusoidal light pattern projected on the object 100 is proceeding $2\pi/N$ radian each time. Assuming that the phase $\phi$ is shifted from 0 radian up to $2(N-1)\pi/N$ radian where N is a positive integer, with an increment of $2\pi/N$ radian each time, the luminance value $I_k(x)$ at a point x obtained for the k-th shifting ($0 \leq k < N$) is given by the following equation (2):

$$I_k(x) = A_0(x) + A(x)\cos(2\pi k/N + \alpha(x)) \quad (2).$$

The phase $\alpha(x)$ is a phase value at a point x in an image captured at k=0. The point 104 is present on a half-line originating from the coordinate x on the camera screen to pass through a lens center. The point 104 as viewed from the light source 101 is present on a plane of the sinusoidal grating 102 determined by a straight line with the phase $\alpha(x)$ and the light source 101. Therefore, if a point of intersection between the straight line and the plane is found, it may be seen that the three-dimensional coordinate value of the point of intersection is that of the point 104.

By introducing two new coefficients $A_1(x)$ and $B_1(x)$ as shown by the following equation (3), the above equation (2) can be rewritten to the following equation (4).

$$A_1(x) = A(x)\cos\alpha(x), \; B_1(x) = -A(x)\sin\alpha(x) \quad (3)$$

$$I_k(x) = A_0(x) + A_1(x)\cos 2\pi k/N + B_1(x)\sin 2\pi k/N \quad (4).$$

$A_1(x)$ and $B_1(x)$ may be found by a following equation (5), using luminance values $I_0(x), \ldots I_{N-1}(x)$ at the point x obtained by N image-capturing operations:

$$A_1(x) = \frac{1}{N}\sum_{k=0}^{N-1} I_k \cos\left(\frac{2\pi k}{N}\right) \quad (5)$$

$$B_1(x) = \frac{1}{N}\sum_{k=0}^{N-1} I_k \sin\left(\frac{2\pi k}{N}\right)$$

The phase $\alpha(x)$ may be found by the following equation (6):

$$\alpha(x) = \tan^{-1}(-B_1(x)/A_1(x)) \quad (6).$$

The phase value of the object 100 on the image is obtained by executing the above-described phase calculations for each pixel on the image taken by the camera 103.

Meanwhile, the phase $\alpha(x)$ obtained from the above equation (6) is unexceptionally wrapped (folded) between $-\pi$ and $\pi$, as may be seen from the fact that calculation is made using an arctangent function $\tan^{-1}(\;)$. The result is that the phase $\alpha(x)$ as found exhibits indefiniteness corresponding to an integer number times $2\pi$, such that, in this state, a three-dimensional shape of the object 100 cannot be found.

By projecting a sinusoidal pattern composed of a period on the entire object 100, the phase $\alpha(x)$ can be uniquely determined. Since, a narrow phase value from $-\pi$ to $\pi$ is allocated at this time to the entire object 100, a high measurement accuracy cannot be achieved.

For this reason, a method is adopted to improve, a measurement accuracy at the cost of phase uniqueness in which a domain of an initial phase is enlarged and a sinusoidal pattern of plural periods is projected on the object 100.

FIG. 2 shows a phase image 105 which is an example of the phase as found in each pixel within an image date captured by the camera 103. In FIG. 2, a phase taking a value from $-\pi$ to $\pi$ is allocated to black to white.

If, for example, a plane is measured, as shown in FIG. 2, there is obtained non-continuous phase, so that it is necessary to determine a relative phase value within an image by suitable techniques to convert non-continuous phases into continuous values. Also, since an absolute phase value cannot be directly obtained, the absolute phase needs to be determined by some means or other.

To solve the above problem, a three-dimensional shape measurement technique has been proposed in U.S. Pat. No. 6,421,629.

FIG. 3 illustrates a state of light projection and a state of an object and cameras in an example of the three-dimensional shape measurement technique disclosed in the U.S. Pat. No. 6,421,629.

As shown in FIG. 3, a light projector-A 201 and a light projector-B 202 project light patterns having spatially sinusoidal luminance distribution onto the object 100. A camera-A 203 and a camera-B 204 capture images of the object 100 in different lines of vision. The conventional three-dimensional shape measurement technique measures the 3-dimensional shape of the object 100 based on the 3-dimensional shape of the object 100 measured by a pair of the projector-A 201 and the camera-A 203 and the 3-dimensional stripe of the object 100 measured by a pair of the projector-B 202 and the camera-B 204.

FIG. 4 illustrates a basic principle of absolute phase determination as disclosed in the U.S. Pat. No. 6,421,629.

FIG. 4(A) shows an image-A (light pattern A) 116, which is a phase image obtained from an image captured by the camera-A 203 with the light projector-A 201 projecting the sinusoidal pattern. FIG. 4(B) shows an image-B (light pattern A) 117, which is a phase image obtained from an image captured by the camera-B 204 with the light projector-A 201 projecting the sinusoidal pattern. The absolute phase of a point-P 112 on the image A 116, that is, a 3-dimensional coordinate position, can be obtained by the following procedure.

First, as shown in FIG. 4(C), the candidate positions of the point P on the 3-dimensional space are obtained as points $P_1$ 113, $P_2$ 114 and $P_3$ 115, from the phase value at the point-P 112 on the image-A (light pattern A) 116 taking into account in determination among integral multiples of $2\pi$. Subsequently, the lines of visions from the camera B 204 to respective ones of the points $P_1$ 113, $P_2$ 114 and $P_3$ 115 are obtained and are plotted on the image-B (light pattern A) 117 as shown in FIG. 4(B). Points which are viewed from the camera-B 204, each corresponding to the points $P_1$ 113, $P_2$ 114 and $P_3$ 115, can be obtained from phase values of the corresponding points on the image B (light pattern A) 117. Accordingly, it is considered that the 3-dimensional coordinate is properly measured and the absolute phase value thereof can be uniquely determined when the relative phase value of only one of the candidate points on the image-B (light pattern A) 117 matches that of the point P 112. By repeatedly performing the above procedure for all points on the image-A (light pattern A) 116, the absolute phase data of a plurality of points on the image-A (light pattern A) 116 can be obtained. Similarly, the absolute phase data of a plurality of points on the image-B (light pattern A) 117 can be obtained.

A more probable absolute phase can be obtained by the following procedure: calculating a product of pixel positions at which the absolute phase data are obtained on the image-A (light pattern A) 116 and the image-B (light pattern A) 117; and masking absolute phase data such that only the absolute phase data of a pixel position at which the calculated product exists is outputted.

The above-described procedure does not determine the absolute phases for all positions but for a great majority of positions in the region viewed by both the camera-A 203 and the camera-B 204. However, the absolute phases of the whole image can be obtained by repeating the step of adding or subtracting an integral multiple of $2\pi$ so as to minimize the phase difference for each pixel around each of the positions at which the absolute phases have been obtained by the above procedure.

A first 3-dimensional shape can be obtained using the well-known principle of triangulation of the projector-A 201 and the camera-A 203 from the absolute phase data of the image-A (light pattern) 116. Similarly, a second 3-dimensional shape can be obtained using the triangulation of the projector-B 202 and the camera-B 204 from the absolute phase data of the image-B (light pattern A) 117. These first and second 3-dimensional shapes are synthesized to finally form the 3-dimensional shape of the whole object 100.

In the above-described conventional method, an ordinary camera may be used as the camera-A 203 or camera-B 204. Accordingly, A lighting device such as a flash can be used to capture a texture image which represents the appearance of a 3-dimensionally shaped object. The texture data is attached to the measured shape data allowing application to catalogues or the like, which allows the seeing of the object from various points of view by using the texture mapping technique in 3-dimensional computer graphics.

The above-described conventional 3-dimensional shape measurement technique can produce the perfect 3-dimensional shape data on the precondition that the position relationship between any of the projector-A 201 and the projector-B 202 and any of the camera-A 203 and the camera-B 204, are precisely determined. In other words, when any pair of them provides the approximately same coordinate position, the 3-dimensional shape of the whole object 100 can be obtained by just synthesizing the first and second 3-dimensional shapes, for example, complementary synthesis.

However, it is actually impossible to obtain the perfect posit-ion relationship among them, resulting in a slightly difference between shapes measured by any two pairs of them. Accordingly, when the measured shapes are simply synthesized, a discontinuous step is developed in the synthesized 3-dimensional shape of the object as shown in FIG. 5.

Referring to FIG. 5, the above-described 3-dimensional measurement is performed in such an arrangement that the projector-A 201 and the camera-A 203 are placed at the left front of the object 100 and the projector-B 202 and the camera B 204 are placed at the right front of the object 100. A measured object 106 is a shape measured based on the visible range of the camera-A 204 on condition of the light pattern A and a measured object 107 is a shape measured based on the visible range of the camera-B 204 on condition of the light pattern B. As described above, it is difficult to exactly obtain the actual position relationship among the projectors and the cameras. Therefore, the measured objects 106 and 107 inevitably include some displacement or error in size. The simplest synthesis method is to divide the measured objects 106 and 107 by an appropriate plane to produce left-half portion 108 and right-half portion 109, which are complementary useful regions. In the simplest synthesis method, the left-half portion 108 and the right-half portion 109 are synthesized to reproduce the finally measured object 110 having discontinuous steps 111 such as displacement or error in size, resulting in reduced quality of 3-dimensional shape measurement.

There have been proposed several shape synthesizing methods. For example, Japanese Patent Application Unexamined Publication No. 5-303629 discloses a shape synthesizing method using both shape data and texture data for texture matching to synthesize the shapes into the shape of the whole object. However, in the case of an object having no pattern, this shape synthesizing method cannot be used. It is possible to manually change the relative position of the measured shapes to minimize the discontinuous steps 111. However, such adjustment must be performed for each shape measurement, expending much effort. In addition to the measured shapes, the obtained textures to be used for position matching inevitably include a slight discontinuous step because the characteristic of the camera-A 230 is generally different from that of the camera-B 204, resulting in reduced quality of texture data.

Japanese Patent Application Unexamined Publication No. 2001-084395 discloses a method of synthesizing two 3-dimensional data using the voxel (volume pixel) feature at a boundary region of the two shapes to gradually reduce a discontinuous step between the shapes. However, such a solution is not a fundamental solution to the above-described discontinuous step problem. Further, the boundary region must be adjusted on an ad-hoc basis.

SUMMARY OF THE INVENTION

An object of the present invention is to provide a three-dimensional shape measurement method and device which can achieve automatic synthesis of a plurality of shapes or textures with high quality.

According to the present invention, a difference among 3-dimensional shapes measured in a plurality of different directions is minimized and then they are synthesized. Similarly, a difference among texture images of brightness and/or color information is minimized and then they are synthesized. Since the difference in shape or texture is minimized, a synthesized three-dimensional shape without incongruity can be obtained.

According to the present invention, a method for measuring a three-dimensional appearance of an object, includes the steps of: a) capturing a plurality of images of the object from different points of view, wherein a light pattern is projected onto the object from at least one position; b) measuring a object based on the plurality of images, wherein the plurality of three-dimensional in-sight appearances each correspond to the plurality of images; and c) correcting differences among the plurality of three-dimensional in-sight appearances to synthesize the three-dimensional appearance of the object.

The step c) includes the steps of: c.1) mapping a set of target points on one of the plurality of images onto each of the plurality of images other than the one image to produce a set of corresponding points; c.2) comparing a captured pattern at each of the target points to captured patterns around each of the corresponding points on the other one image to determine a most matched point for each of the target points to produce a set of must matched points; and c.3) minimizing a difference between the set of target points and the set of most matched points to correct a three-dimensional in-sight appearance on the other one image.

According to an aspect of the present invention, a method for measuring three-dimensional shape of an object, includes the steps of: a) capturing first and second images of the object onto which a light pattern is projected, wherein each of the first and second images is captured from a different point of view; b) measuring first and second three-dimensional shapes of the object based on the first and second images; and c) correcting a position difference between the first and second three-dimensional shapes by obtaining a precise correspondence between the first and second images from captured patterns of the first and second images.

The method may further include the step of: d) correcting a texture difference between the first and second three-dimensional shapes by obtaining a precise correspondence between the first and second images from captured textures of the first and second images.

The stop d) may include the steps of: d.1)) sequentially selecting a target point from the first image; d.2) calculating a corresponding point on the second image, where the corresponding point corresponds to the target point on the first image; d.3) searching a predetermined region around the corresponding point on the second image for a matched point providing texture data that most matches texture data at the target point; d.4) repeating the steps c.1) to c.3) to produce a target texture list of target texture data and a matched texture list of matched texture data; and d.5) minimizing a difference between the target texture list and the matched texture list to correct the matched texture data of the second three-dimensional shape with respect to the target texture data of the first three-dimensional shape.

According to another aspect of the present invention, a method for measuring a three-dimensional shape of an object, includes the steps of: a) capturing first and second images of the object onto which a light pattern is projected, wherein each of the first and second images captured from a different point of view; b) measuring first and second three-dimensional shapes of the object based on the first and second images; and c) correcting a texture difference between the first and second three-dimensional shapes by obtaining a precise correspondence between the first and second images from captured textures of the first and second images.

BRIEF DESCRIPTION OF THE DRAWINGS

FIGS. 4A-4C are schematic diagrams FIG. 4 is a schematic diagram showing a basic principle of absolute phase determination in the second example of the convention three-dimensional shape measurement system.

FIG. 5 is a schematic diagram showing a synthesis process of two measured shapes in the second example of the conventional three-dimensional shape measurement system;

FIG. 7 is a block diagram showing a 3-dimensional shape correction section of the three-dimensional shape measurement device as shown in FIG. 6;

DESCRIPTION OF THE PREFERRED EMBODIMENTS

1. First Embodiment

Figure 1:
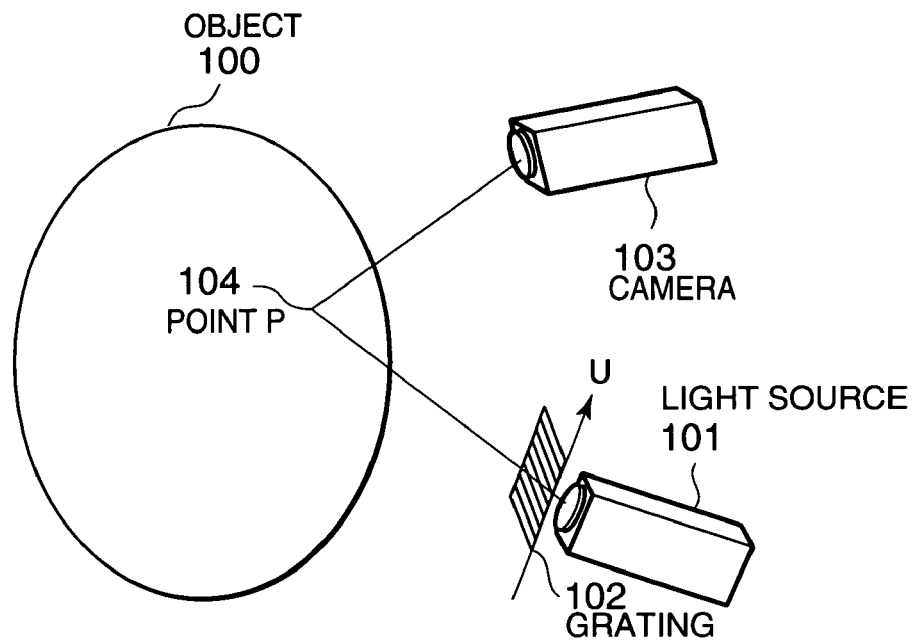
FIG. 1 is a schematic diagram showing a first example of a conventional three-dimensional shape measurement system.
Figure 2:
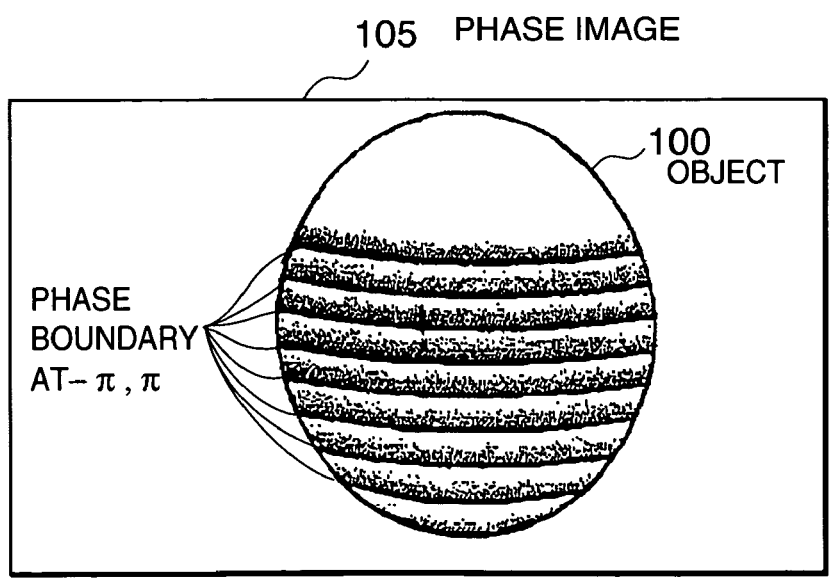
FIG. 2 is a diagram showing a phase image which includes the phase as found in each pixel within image date captured by a camera.
Figure 3:
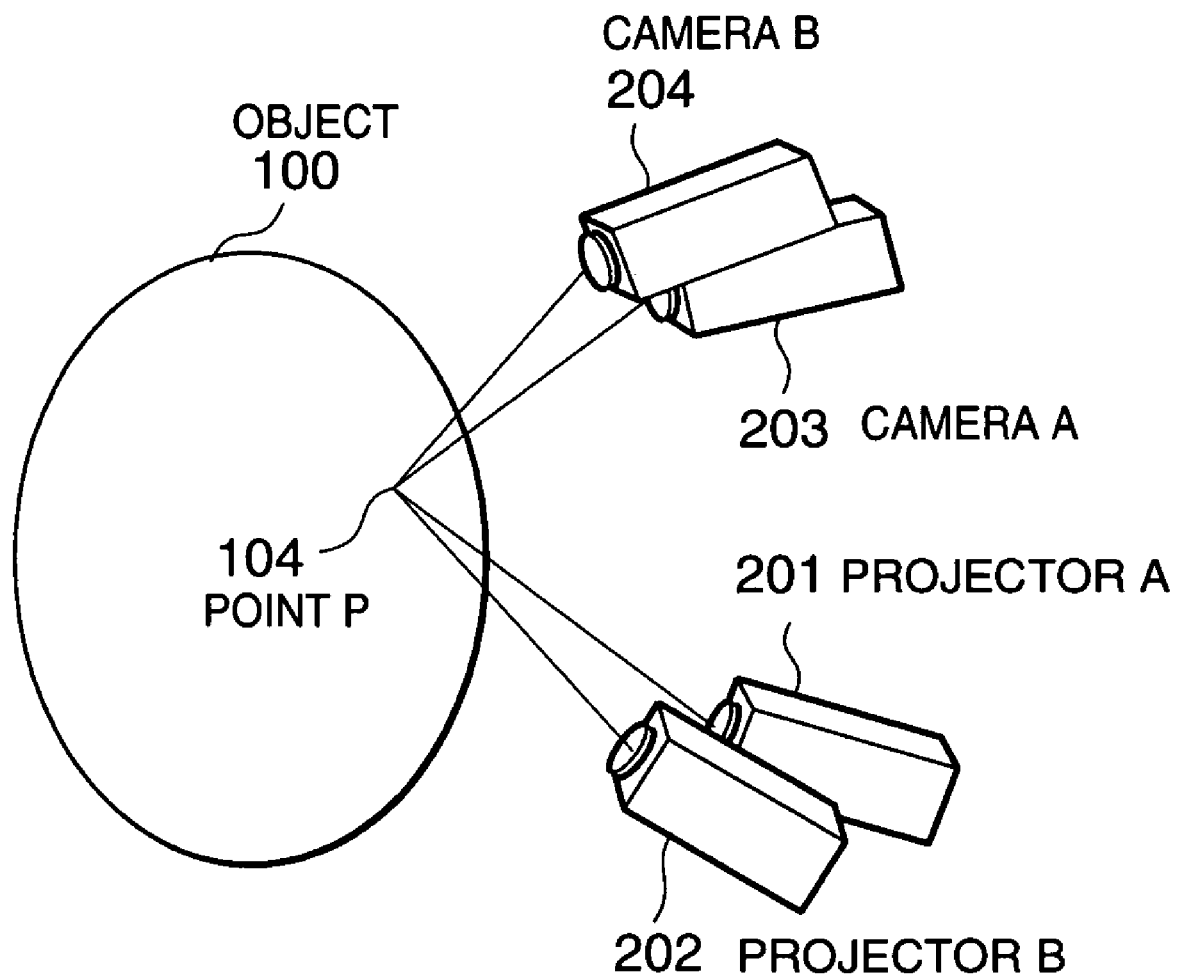
FIG. 3 is a schematic diagram showing a second example of a conventional three-dimensional shape measurement system.
Figure 6:
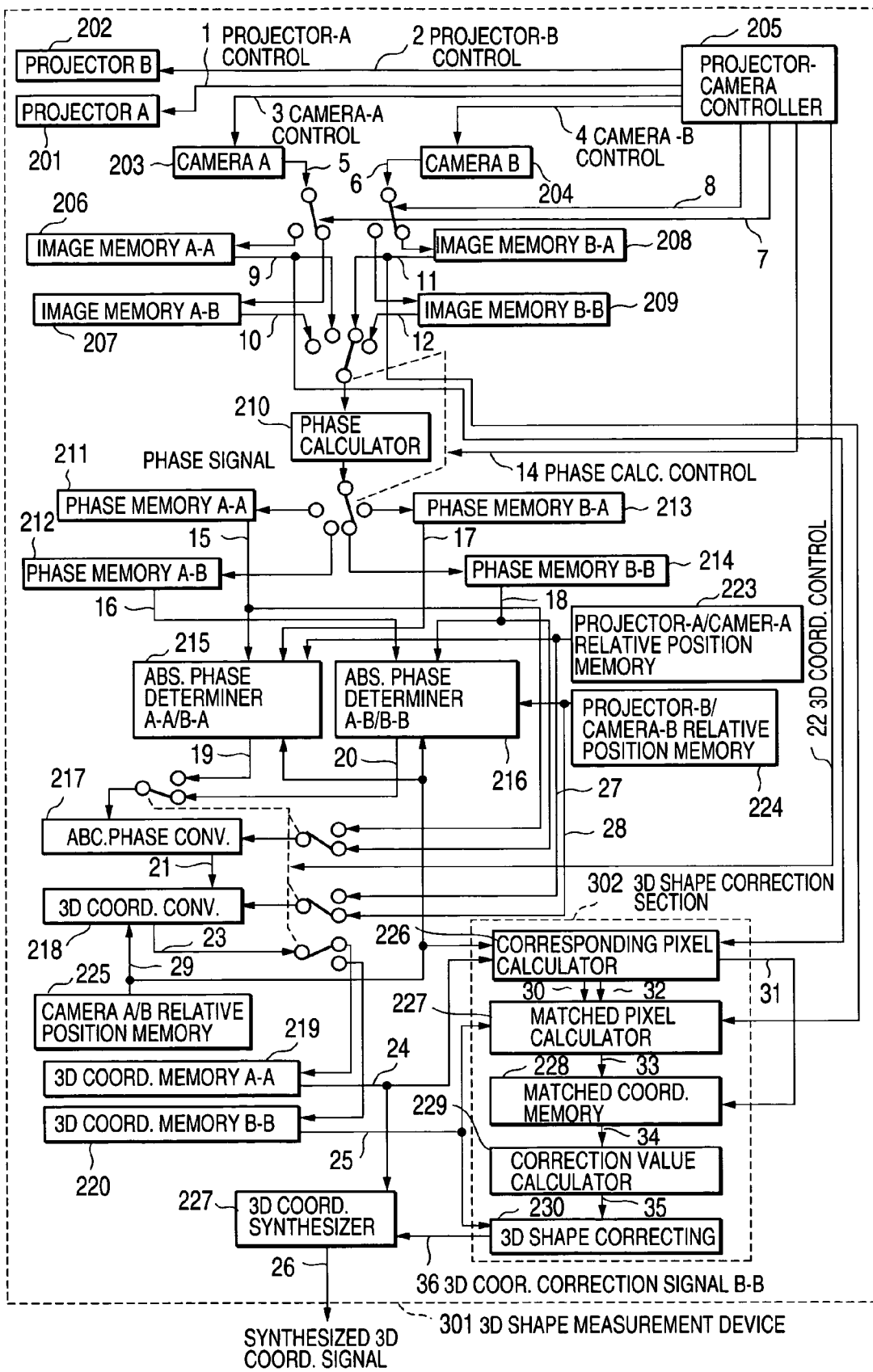
FIG. 6 is a block diagram showing a three-dimensional shape measurement device according to a first embodiment of the present invention.

Referring to FIG. 6, a light projector-A 201 and a light projector-B 202 project light patterns having spatially sinusoidal luminance distribution or triangular luminance distribution onto an object. A camera-A 203 and a camera-B 204 capture images of the object in different lines of vision. The position relationship of them are shown in FIG. 3

A three-dimensional shape measurement device 301 according to a first embodiment of the present invention measures the 3-dimensional shape of the object by synthesizing a first 3-dimensional shape of the object measured by a pair of the projector-A 201 and the camera-A 203 and a second 3-dimensional shape of the object measured by a pair of the projector-B 202 and the camera-B 204. The principle of 3-dimensional shape measurement has been described in the U.S. Pat. No. 6,421,629.

The three-dimensional shape measurement device 301 includes a projector-camera controller 205 which controls the light pattern projection from the light projectors and the image capturing of the cameras. More specifically, the projector-camera controller 205 outputs a projector-A control signal 1, a projector-B control signal 2, a camera-A control signal 3, and a camera-B control signal 4 to control the light projector-A 201, the light projector-B 202, the camera-A 203 and the camera-B 204, respectively. The projector-camera controller 205 further outputs a camera-A output control signal 7, a camera-B output control signal 8, a phase calculation control signal 14, and a 3-dimensional coordinate control signal 22 to control the phase calculation and the 3-dimensional shape calculation, which will be described later.

Under the control of the projector-camera controller 205, the light projector-A 201 and the light projector-B 202 each project sinusoidal light patterns while shifting a phase of the sinusoidal light pattern by ¼ the period of the sinusoidal light pattern.

Under the control of the projector camera controller 205, the camera-A 203 and the camera-B 204 capture light pattern images projected by the light projector-A 201 and the light projectors 202 a plurality of times (here, four times) synchronizing to the phase shift of the light pattern to output a camera-A output signal 5 and a camera-B output signal 6, respectively.

The three-dimensional shape measurement device 301 further includes image memories 206-209. Under the control of the projector-camera controller 205, the image memories 206-209 store respective combinations of images captured by the camera-A 203 and the camera-B 204 when the light projector-A 201 and the light projector-B 202 are controlled.

More specifically, the image memory A-A 206 inputs the camera-A output signal 5 from the camera-A 203 when the light projector-A 201 projects the light pattern, and outputs an image signal A-A 9. The image memory A-B 207 inputs the camera-A output signal 5 from the camera-A 203 when the light projector-B 202 projects the light pattern and outputs an image signal A-B 10.

Similarly, the image memory B-A 208 inputs the camera-B output signal 6 from the camera-B 204 when the light projector-A 201 projects the light pattern, and outputs an image signal B-A 11. The image memory B-B 209 inputs the camera-B output signal 6 from the camera-B 204 when the light projector-B 202 projects the light pattern, and outputs an image signal B-B 12.

The three-dimensional shape measurement device 301 further includes a phase calculator 210, which inputs an image signal from a selected one of the image memories 206-209 and outputs a phase signal 13 to a selected one of phase memories 211-214 according to the phase calculation control signal 14. The phase calculator 210 calculates a phase value based on the equations (5) and (6), which are described before.

Under the control of the projector-camera controller 205, the phase memories 211-214 input the phase signal 13 to store phase values obtained from images captured by respective combinations of camera and projector. The phase memory A-A 211 outputs a phase signal A-A 15 to an absolute phase determiner A-A/B-A 215. The phase memory A-B 212 outputs a phase signal A-B 16 to an absolute phase determiner A-B/B-B 216. The phase memory B-A 213 outputs a phase signal B-A 17 to the absolute phase determiner A-A/B-A 215. The phase memory B-B 214 outputs a phase signal B-B 18 to the absolute phase determiner A-B/B-B 216.

The three-dimensional shape measurement device 301 further includes a projector-A/camera-A relative position memory 223 and a projector-B/camera-B relative position memory 224 The projector-A/camera-A relative position memory 223 stores a relative position and direction relationship between the projector-A 201 and the camera-A 203, which is used to calculate a 3-dimensional coordinate based on the triangulation principle. The projector-B/camera-B relative position memory 224 stores a relative position and direction relationship between the projector-B 202 and the camera-B 204, which is used to calculate a 3-dimensional coordinate based on the triangulation principle. The projector A/camera-A relative position memory 223 and the projector-B/camera-B relative position memory 224 output a projector-A/camera-A relative position and direction signal 27 and a projector-B/camera-B relative position and direction signal 28, respectively.

In addition, the three-dimensional shape measurement device 301 includes a camera-A/B relative position memory 225, which stores a relative position relationship between the camera-A 203 and the camera-B 204. The camera-A/B relative position relationship is used to obtain the direction of line of vision of one camera viewing a 3-dimensional coordinate position measured from an image captured by the other camera The camera-A/B relative position memory 225 outputs a camera-A/B relative position and direction signal 29.

The absolute phase determine A-A/B-A 215 inputs the phase signal A-A 15, the phase signal B-A 17, the projector-A/camera-A relative position and direction signal 27, and the camera-A/B relative position and direction signal 29 to determine an absolute phase value according to the principle of the absolute phase determination as shown in FIG. 4. In other words, the absolute phase determiner A-A/B-A 215 determines the absolute phase value based on the phase images obtained from the camera-A 203 and the camera-B 204 when the light projector-A 201 projects the light pattern. The determined absolute phase value and the remaining relative phase values that have never been determined are outputted as an absolute phase signal A-A (A-A/B-A) 19 to an absolute phase converter 217 according to the 3-dimensional coordinate control signal 22 inputted from the projector-camera controller 205.

The absolute phase determiner A-B/B-B 216 inputs the phase signal A-B 16, the phase signal B-B 18, the projector-B/camera-B relative position and direction signal 28, and the camera-A/B relative position and direction signal 29 to determine an absolute phase value as described above. The determined absolute phase value and the remaining relative phase values that have never been determined are outputted as an absolute phase signal B-B (A-B/B-B) 20 to the absolute phase converter 217 according to the 3-dimensional coordinate control signal 22.

The absolute phase convertor 217 inputs a selected one of the absolute phase signal A-A (A-A/B-A) 19 and the absolute phase signal B-B (A-B/B-B) 20 and a selected one of the phase signal. A-A 15 and the phase signal B-B 18, depending on the 3-dimensional coordinate control signal 22. As described before, the absolute phase converter 217 determines absolute phase values for the remaining relative phase values based on the absolute phases that have been determined by the absolute phase determiner A-A/B-A 215 and the absolute phase determiner A-B/B-B 216 such that the remaining absolute phase values are smoothly changed as a whole from centers corresponding to respective ones of the absolute phases. In this manner, the absolute phase converter 217 outputs a converted absolute phase signal 21 to a 3-dimensional coordinate converter 218.

The 3-dimensional coordinate converter 218 inputs the converted absolute phase signal 21, the camera-A/B relative position and direction signal 29, and a selected one of the projector-A/camera-A relative position and direction signal 27 and the projector-B/camera-B relative position and direction signal 28 depending on the 3-dimensional coordinate control signal 22. The 3-dimensional coordinate converter 218 converts the inputted absolute phase value to a 3-dimensional coordinate value to output it as a 3-dimensional coordinate signal 23 to a selected one of a 3-dimensional coordinate memory A-A 219 and a 3-dimensional coordinate memory B-B 220 depending on the 3 dimensional coordinate control signal 22.

The 3-dimensional coordinate memory A-A 219 stores a 3-dimensional coordinate value measured by a pair of the light projector-A 201 and the camera-A 203 and outputs a 3-dimensional coordinate value signal A-A 24 to a 3-dimensional shape correction section 302 and a 3-dimensional coordinate synthesizer 221. The 3-dimensional coordinate memory B-B 220 stores a 3-dimensional coordinate value measured by a pair of the light projector-B 202 and the camera-D 204 and outputs a 3-dimensional coordinate value signal B-B 25 to the 3-dimensional shape correction section 302.

The 3-dimensional shape correction section 302 inputs the 3-dimensional coordinate value signal A-A 24, the 3-dimensional coordinate value signal B-B 25, the camera-A/B relative position and direction signal 29, the image signal A-A 9, and the image signal B-A 11. The 3-dimensional shape correction section 302 corrects the 3-dimensional shape measured from the pair of the light projector-B 202 and the camera-B 204 so as to match the 3-dimensional shape measured from the pair of the light projector-A 201 and the camera-A 203 as much as possible to output a 3-dimensional coordinate correction signal B-B 36 to the 3-dimensional coordinate synthesizer 221. The details of the 3-dimensional shape correction section 302 will be described later.

The 3-dimensional coordinate synthesizer 221 inputs the 3-dimensional coordinate value signal A-A 24 and the 3-dimensional coordinate correction signal B-B 36 to correct the 3-dimensional shape to produce a synthesized 3-dimensional coordinate signal 26.

3-dimensional Shape Correction

As shown in FIG. 7, the 3-dimensional shape correction section 302 includes a corresponding pixel calculator 226, a matched pixel calculator 227, a matched coordinate memory 228, a correction value calculator 229, and a 3-dimensional shape correcting section 230.

The corresponding pixel calculator 226 inputs the 3-dimensional coordinate value signal A-A 24, the camera-A/B relative position and direction signal 29, and the image signal A-A 9 and outputs target pixel signal 30, a target 3-dimensional coordinate signal 31, and a corresponding pixel signal 32. The target pixel signal 30 is pixel information of a target pixel in the image signal A-A 9 where the target pixel is a certain pixel of the camera-A 203. The target 3-dimensional coordinate signal 31 is a 3-dimensional coordinate value measured at the target pixel. The corresponding pixel signal 32 is a pixel position corresponding to the target 3-dimensional coordinate value on the image captured by the camera-B 204.

The matched pixel calculator 227 inputs the target pixel signal 30, the corresponding pixel signal 32, the 3-dimensional coordinate value signal B-B 25 and the image signal B-A 11 and outputs a matched 3-dimensional coordinate signal 33 to the matched coordinate memory 228. First, the matched pixel calculator 227 calculates a corresponding pixel position at which the image information of a target pixel on the image captured by the camera-A 203 matches the image information of a pixel around a pixel corresponding to the target pixel on the image captured by the camera-B 204 as much as possible. Thereafter, the matched pixel calculator 227 calculates the 3-dimensional coordinate value measured by the pair of the camera-B 204 and the light projector-B 202 at the corresponding pixel position to output the 3-dimensional coordinate value as the matched 3-dimensional coordinate signal 33.

Figure 8A:
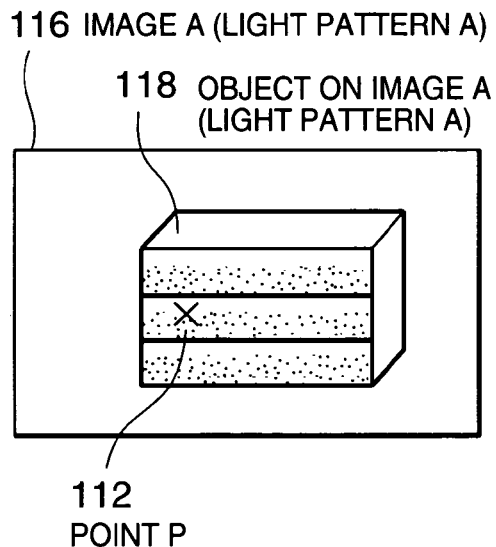
FIGS. 8A-8C are diagrams showing an absolute phase determination process in the first embodiment of the present invention.
Figure 8B:
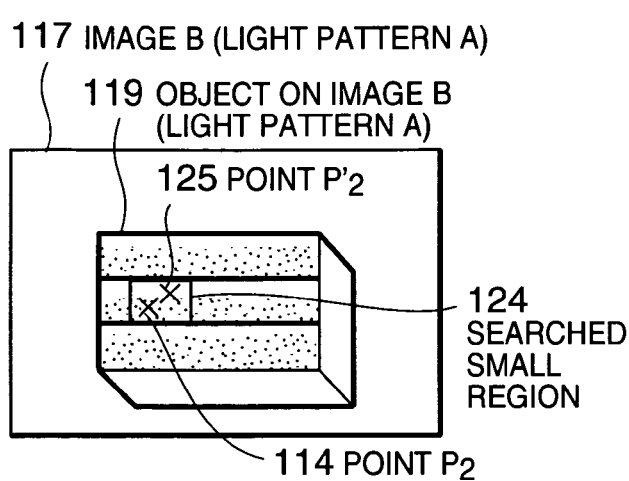
Figure 8C:
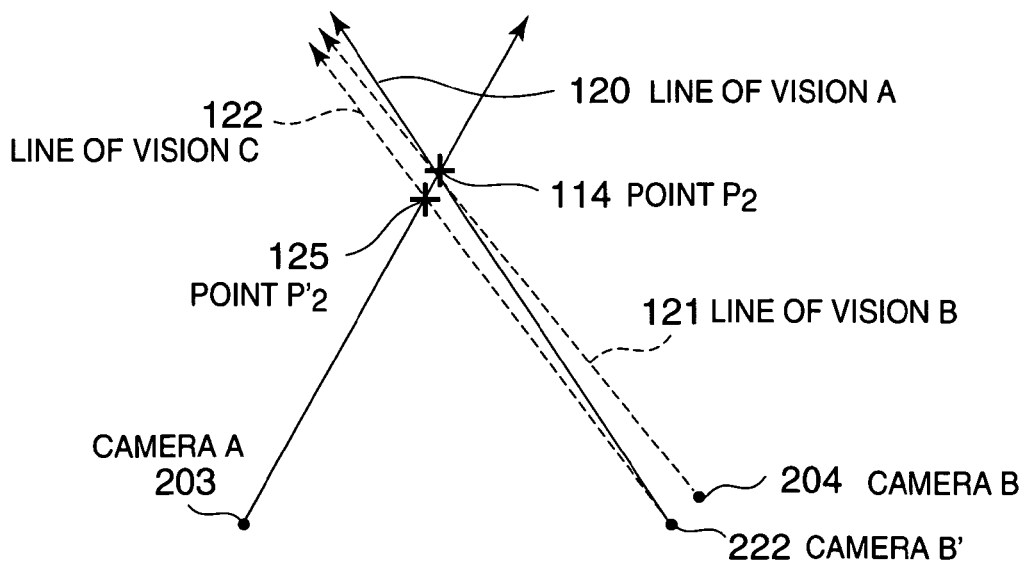

An operation of the corresponding pixel calculator 226 and the matched pixel calculator 227 will be described with reference to FIGS. 8A-8C. It is an assumed that the camera-A 203 and the camera-B 204 are placed at proper positions and the light projector-A 201 and the light projector-b 202 are also placed at proper positions, respectively. On this assumption, the 3-dimensional coordinate value of the point P 112 measured by the pair of the camera-A 203 and the light projector-A 201 matches the 3-dimensional coordinate value measured by the pair of the camera-B 204 and the light projector-B 202. However, assuming that the arrangement of the light projector-A 201 and the light projector-b 202 cannot be known without some error, the respective measured 3-dimensional coordinate value are generally different from each other. In addition, it is difficult to exactly determine the position relationship between the camera-A 203 and the camera-B 204.

The corresponding pixel calculator 226 uses the relative position and direction of the camera-A 203 and the camera-B 204 to map the point P 112 measured by the pair of the camera-A 203 and the light projector-A 201 onto the camera-B 204, and thereby calculates pixels of the camera-B 204 corresponding to the same point 112 when the camera-B 204 observes the same point P 112. However, as described above, the actual camera position indicated by "camera-B' 222" deviates from the ideal camera position indicated by "camera-B 204". Accordingly, the point P 122, or point $P_2$ 114, does not exist on the line of vision C 122 originating from the camera-B' 222.

Therefore, the matched pixel calculator 227 searches a predetermined small region 124 around the point $P_2$ 114 on the image B (light pattern A) 117 to find a pixel at which its pixel information matches the pixel information of the P 112 on the image A (light pattern A) 116 as much as possible. In this sample the found pixel is assumed to be a point $P'_2$ 125, which is outputted as the matched 3-dimensional coordinate signal 33 to the matched coordinate memory 228.

The matched coordinate memory 228 inputs the target 3-dimensional coordinate signal 31 and the matched 3-dimensional coordinate signal 33 to store them as a pair of corresponding 3-dimensional coordinate values. The matched coordinate memory 228 outputs a matched 3-dimensional coordinate list signal 34 including the pair at any time. As shown in FIGS. 8A-8C, the matched coordinate memory 228 stores as a pair the 3-dimensional coordinate value of the point 112 measured by the pair of the camera-A 203 and the light projector-A 201 and the point $P'_2$ 125 measured by the pair of the camera-B 204 and the light projector-B 202.

The correction value calculator 229 inputs the matched 3-dimensional coordinate list signal 34 to calculate the amount of correction so that the pair of corresponding 3-dimensional coordinate values match each other as much as possible. The calculated amount of correction is outputted as a coordinate correction signal 35 to a 3-dimensional shape correcting section 230.

More specifically, it is assumed that a list of 3-dimensional coordinate values measured by the pair of the light projector-A 201 and the camera-A 203 is represented by the following formula (7) and a list of 3-dimensional coordinate values measured by the pair of the light projector-B 202 and the camera-B 204 is represented by the following formula (8):

$$\begin{pmatrix} x_1 & x_2 & & x_n \\ y_1 & y_2 & \cdots & y_n \\ z_1 & z_2 & & z_n \end{pmatrix}; \quad (7)$$

and $$\begin{pmatrix} x'_1 & x'_2 & & x'_n \\ y'_1 & y'_2 & \cdots & y'_n \\ z'_1 & z'_2 & & z'_n \end{pmatrix}. \quad (8)$$

In the formulae (7) and (8), $^t(x_i, y_i, z_i)$ and $^t(x'_i, y'_i, z'_i)$ are a pair of i-th 3-dimensional coordinate values, where $1 \leq i \leq n$ (n is the number of pairs). Here, for simplicity, a column vector is transposed to a row vector, which is labeled with "t".

Assuming a 3×3 rotation matrix R and a 3×1 parallel translation matrix T as correction in the 3-dimensional space, R and T are determined so as to minimize a cost function E(R, T). In this embodiment, the well-known least-squares method is used to determine R and T so as to minimize the cost function B(R, T) defined by the following equation (9):

$$E(R, T) = \left\| \begin{pmatrix} x_1 & x_2 & & x_n \\ y_1 & y_2 & \cdots & y_n \\ z_1 & z_2 & & z_n \end{pmatrix} - R \begin{pmatrix} x'_1 & x'_2 & & x'_n \\ y'_1 & y'_2 & \cdots & y'_n \\ z'_1 & z'_2 & & z'_n \end{pmatrix} + T \right\|^2. \quad (9)$$

The 3-dimensional shape correcting section 230 inputs the coordinate correction signal 35 and the 3-dimensional coordinate signal B-B 25 and uses the determined rotation matrix R and the parallel translation matrix T to convert a coordinate value group measured by the pair of the light projector-B 202 and the camera-B 204 to output the 3-dimensional coordinate correction signal B-B 36 to the 3-dimensional coordinate synthesizer 221.

In the 3-dimensional shape correcting section 230 as described above, the general affine transformation is used. However, an arbitrary transformation for transforming a 3-dimensional coordinate group can be used. For example, a 4-th element is added to $^t(x_i, y_i, z_i)$ to yield $^t(x_i, y_i, z_i, 1)$ and a 3×4 transformation matrix S can be used to determine each element of S so as to minimize a cost function F(S) defined by the following equation (10):

$$F(S) = \left\| \begin{pmatrix} x_1 & x_2 & & x_n \\ y_1 & y_2 & \cdots & y_n \\ z_1 & z_2 & & z_n \\ 1 & 1 & & 1 \end{pmatrix} - S \begin{pmatrix} x'_1 & x'_2 & & x'_n \\ y'_1 & y'_2 & \cdots & y'_n \\ z'_1 & z'_2 & & z'_n \\ 1 & 1 & & 1 \end{pmatrix} \right\|^2 \quad (10)$$

$$= \left\| \begin{pmatrix} x_1 & x_2 & & x_n \\ y_1 & y_2 & \cdots & y_n \\ z_1 & z_2 & & z_n \\ 1 & 1 & & 1 \end{pmatrix} - \begin{pmatrix} a_1 & a_2 & a_3 & a_4 \\ a_5 & a_6 & a_7 & a_8 \\ a_9 & a_{10} & a_{11} & a_{12} \end{pmatrix} \begin{pmatrix} x'_1 & x'_2 & & x'_n \\ y'_1 & y'_2 & \cdots & y'_n \\ z'_1 & z'_2 & & z'_n \\ 1 & 1 & & 1 \end{pmatrix} \right\|^2$$

In the first embodiment as described above, a 3-dimensional coordinate value for correction is represented in the Cartesian coordinate system xyz. Tho present invention is not limited to the Cartesian coordinate system xyz. Another coordinate system such as polar coordinate system may be used for embodiments of the present invention.

As described above, the 3-dimensional shape correction section 302 in the first embodiment corrects the 3-dimensional shape. However, in the case where the 3-dimensional shape measurement device also captures texture data, the approximately same structure can be used to determine the 3-dimensional shape based on a texture data matching procedure similar to the above-described procedure.

2. Second Embodiment

Figure 9:
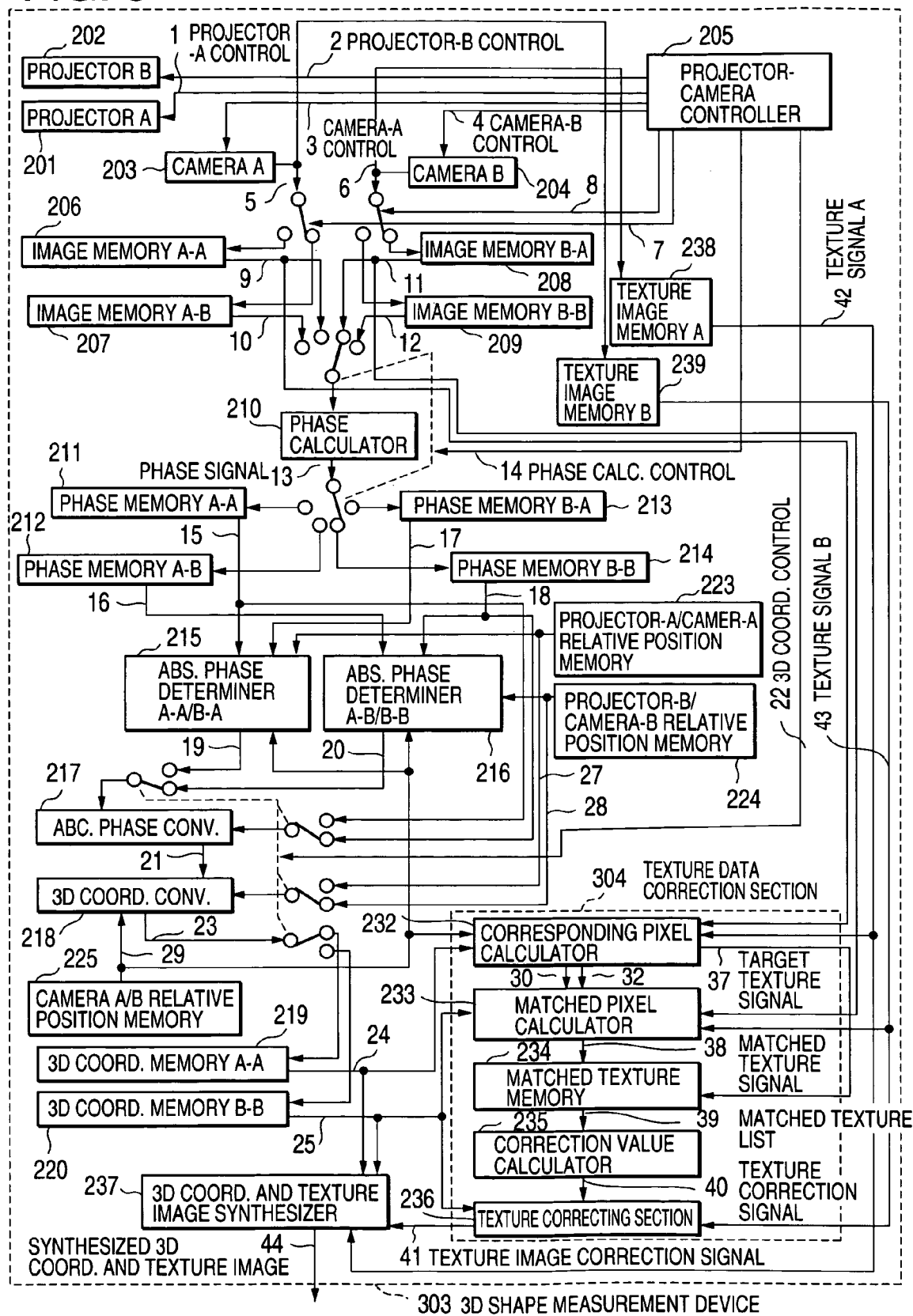
FIG. 9 is a block diagram showing a three-dimensional shape measurement device according to a second embodiment of the present invention.

Referring to FIG. 9, a light projector-A 201 and a light projector-B 202 project light patterns having spatially sinusoidal luminance distribution or triangular luminance distribution onto an object. A camera-A 203 and a camera-B 204 capture images of the object in different lines of vision. The position relationship of them are shown in FIG. 3.

A 3-dimensional shape measurement device 303 according to a second embodiment of the present invention measures the 3-dimensional shape of the object by synthesizing a first 3-dimensional shape of the object measured by a pair of the projector-A 201 and the camera-A 203 and a second 3-dimensional shape of the object measured by a pair of the projector-B 202 and the camera-B 204. The principle of 3-dimensional shape measurement has been described in the U.S. Pat. No. 6,421,629. In addition, the 3-dimensional shape measurement device 303 captures texture images of an object onto which no light pattern is projected for measurement.

The 3-dimensional shape measurement device 303 includes a projector-camera controller 205 which controls the light pattern projection from the light projectors and the image capturing of the cameras. More specifically, the projector-camera controller 205 outputs a projector-A control signal 1, a projector-B control signal 2, a camera-A control signal 3, and a camera-B control signal 4 to control the light projector-A 201, the light: projector-B 202, the camera-A 203 and the camera-B 204, respectively. The projector-camera controller 205 further outputs a camera-A output control signal 7, a camera-B output control signal 8, a phase calculation control signal 4, and a 3-dimensional coordinate control signal 22 to control the phase calculation and the 3-dimensional shape calculation, which will be described later.

Under the control of the projector-camera controller 205, the light projector-A 201 and the light projector-B 202 each project sinusoidal light patterns while shifting phases of the sinusoidal light patterns by ¼ the period of the sinusoidal light pattern.

Under the control of the projector-camera controller 205, the camera-A 203 and the camera-B 204 capture light pattern images projected by the light projector-A 201 and the light projector-B 202 to output a camera-A output signal 5 and a camera-B output signal 6, respectively.

In addition, under the control of the projector-camera controller 205, the camera-A 203 and the camera-B 204 capture texture images to output the camera-A output signal 5 and the camera-B output signal 6 to a texture image memory A 238 and a texture image memory B 239, respectively. The texture image memory A 238 and the texture image memory B 239 outputs a texture signal A 42 and a texture signal B 43 to a texture data correction section 304, which will be described later.

The three-dimensional shape measurement device 303, further includes image memories 206-209. Under the control of the projector-camera controller 205, the image memories 206-209 store respective combinations of images captured by the camera-A 203 and the camera-B 204 when the light projector-A 201 and the light projector-B 202 are controlled More specifically, the image memory A-A 206 inputs the camera-A output signal 5 from the camera-A 203 when the light projector-A 201 projects the light pattern, and outputs an image signal A-A 9. The image memory A-B 207 inputs the camera-A output signal 5 from the camera-A 203 when the light projector-B 202 projects the light pattern, and outputs an image signal A-B 10.

Similarly, the image memory B-A 200 inputs the camera-B output signal 6 from the camera-B 204 when the light projector-A 201 projects the light pattern, and outputs an image signal B-A 11. The image memory B-B 209 inputs the camera-B output signal 6 from the camera-B 204 when the light projector-B 202 projects the light pattern, and outputs an image signal B-B 12.

The three-dimensional shape measurement device 303 further includes a phase calculator 210, which inputs an image signal from a selected one of the image memories 206-209 and outputs a phase signal 13 to a selected one of phase memories 211-214 according to the phase calculation control signal 14. The phase calculator 210 calculates a phase value based on the equations (5) and (6), which are described before.

Under the control of the projector-camera controller 205, the phase memories 211-214 input the phase signal 13 to store phase values obtained from images captured by respective combinations of camera and projector. The phase memory A-A 211 outputs a phase signal A-A 15 to an absolute phase determiner A-A/B-A 215. The phase memory A-B 212 outputs a phase signal A-B 16 to an absolute phase determiner A-B/B-B 216. The phase memory B-A 213 outputs phase signal B-A 17 to the absolute phase determiner A-A/B-A 215. The phase memory B-B 214 outputs a phase signal B-B 18 to the absolute phase determiner A-B/B-B 216.

The three-dimensional shape measurement device 303 further includes a projector-A/camera-A relative position memory 223 and a projector-B/camera-B relative position memory 224. The projector-A/camera-A relative position memory 223 stores a relative position and direction relationship between the projector-A 201 and the camera-A 203, which is used to calculate a 3-dimensional coordinate based on the triangulation principle. The projector-B/camera-B relative position memory 224 stores a relative position and direction relationship between the projector-S 202 and the camera-B 204, which is used to calculate a 3-dimensional coordinate based on the triangulation principle. The projector-A/camera-A relative position memory 223 and the projector-B/camera-B relative position memory 224 output a projector-A/camera-A relative position and direction signal 27 and a projector-B/camera-B relative position and direction signal 28, respectively.

In addition, the three-dimensional shape measurement device 303 includes a camera-A/B relative position memory 225, which stores a relative position relationship between the camera-A 203 and the camera-B 204. The camera-A/B relative position relationship is used to obtain the direction of line of vision of one camera viewing a 3-dimensional coordinate position measured from an image captured by the other camera. The camera-A/B relative position memory 225 outputs a camera-A/B relative position and direction signal 29.

The absolute phase determiner A-A/B-A 215 inputs the phase signal A-A 15, the phase signal B-A 17, the projector-A/camera-A relative position and direction signal 27, and the camera-A/B relative position and direction signal 29 to determine an absolute phase value according to the principle of the absolute phase determination as shown in FIG. 4. In other words, the absolute phase determiner A-A/B-A 215 determines the absolute phase value based on the phase images obtained from the camera-A 203 and the camera-B 204 when the light projector-A 201 projects the light pattern. The determined absolute phase value and the remaining relative phase values that have never been determined are outputted as an absolute phase signal A-A (A-A/B-A) 19 to an absolute phase converter 217 according to the 3-dimensional coordinate control signal 22 inputted from the projector-camera controller 205.

The absolute phase determiner A-B/B-B 216 inputs the phase signal A-B 16, the phase signal B-B 18, the projector-B/camera-B relative position and direction signal 28, and the camera-A/B relative position and direction signal 29 to determine an absolute phase value as described above. The determined absolute phase value and the remaining relative phase values that have never been determined are outputted as an absolute phase signal B-B (A-B/B-B) 20 to the absolute phase converter 217 according to the 3-dimensional coordinate control signal 22.

The absolute phase converter 217 inputs a selected one of the absolute phase signal A-A (A-A/B-A) 19 and the absolute phase signal B-B (A-B/B-B) 20 and a selected one of the phase signal A-A 15 and the phase signal B-B 18, depending on the 3-dimensional coordinate control signal 22. As described before, the absolute phase converter 217 determines absolute phase values for the remaining relative phase values based on the absolute phases that have been determined by the absolute phase determiner A-A/B-A 215 and the absolute phase determiner A-B/B-B 216 such that the remaining absolute phase values are smoothly changed as a whole from centers corresponding to respective ones of the absolute phases. In this manner, the absolute phase converter 217 outputs a converted absolute phase signal 21 to a 3-dimensional coordinate converter 218.

The 3-dimensional coordinate converter 218 inputs the converted absolute phase signal 21, the camera-A/B relative position and direction signal 29, and a selected one of the projector-A/camera-A relative position and direction signal 27 and the projector-B/camera-B relative position and direction signal 28 depending on the 3-dimensional coordinate control signal 22. The 3-dimensional coordinate converter 218 converts the inputted absolute phase value to a 3-dimensional coordinate value to output it as a 3-dimensional coordinate signal 23 to a selected one of a 3-dimensional coordinate memory A-A 219 and a 3-dimensional coordinate memory B-B 220 depending on the 3-dimensional coordinate control signal 22.

The 3-dimensional coordinate memory A-A 219 stores a 3-dimensional coordinate value measured by a pair of the light projector-A 201 and the camera-A 203 and outputs a 3-dimensional coordinate value signal A-A 24 to a texture data correction section 304 and a 3-dimensional coordinate and texture image synthesizer 237. The 3-dimensional coordinate memory B-B 220 stores a 3-dimensional coordinate value measured by a pair of the light projector-B 202 and the camera-B 204 and outputs a 3-dimensional coordinate value signal B-B 25 to the texture data correction section 304.

The texture data correction section 304 inputs the 3-dimensional coordinate value signal A-A 24, the 3-dimensional coordinate value signal B-B 25, the camera-A/B relative position and direction signal 29, the texture signal A 42, the texture signal B 43, the image signal A-A 9, and the image signal B-A 11. The texture data correction section 304 corrects the texture data captured by the camera-B 204 so as to match the texture data captured by the camera-A 203 as much as possible to output a texture data correction signal B 41 to the 3-dimensional coordinate and texture, image synthesizer 237. The details of the texture data correction section 304 will be described later.

The 3-dimensional coordinate and texture image synthesizer 237 inputs the 3-dimensional coordinate value signal A-A 24 and the 3-dimensional coordinate value signal B-B 25 to synthesize the two 3-dimensional shapes and the texture data to produce a synthesized 3-dimensional coordinate and texture signal 44.

Texture Data Correction

As shown in FIG. 9, the texture data correction section 304 includes a corresponding pixel calculator 232, a matched pixel calculator 233, a matched texture memory 234, a correction value calculator 235, and a texture correcting section 236.

The corresponding pixel calculator 232 inputs the 3-dimensional coordinate value signal A-A 24, the camera-A/B relative position and direction signal 29, the texture signal A 42, and the image signal A A 9 and outputs a target pixel signal 30, a corresponding pixel signal 32, and a target texture signal 37. The target pixel signal 30 is pixel information of a target pixel in the image signal A-A 9 where the target pixel is a certain pixel of the camera-A 203. The target texture signal 37 is texture data at the target pixel. The corresponding pixel signal 32 is a pixel position corresponding to the target 3-dimensional coordinate value on the image captured by the camera-B 204.

The matched pixel calculator 233 inputs the target pixel signal 30, the corresponding pixel signal 32, the image signal B-A 11, and the texture signal B 43 and outputs a matched texture signal 38 to the matched texture memory 234. First, the matched pixel calculator 233 calculates a corresponding pixel position at which the image information of a target pixel on the image captured by the camera-A 203 matches the image information of a pixel around a pixel corresponding to the target pixel on the image captured by the camera-B 204 as much as possible. Thereafter, the matched pixel calculator 233 outputs as the matched texture signal 38 the texture data captured by the camera-B 204 at the corresponding pixel position.

The matched texture memory 234 inputs the target texture signal 37 and the matched texture signal 38 to store them as a pair of corresponding texture data. The matched texture memory 234 outputs a matched texture list signal 39 including the pair at any time.

The correction value calculator 235 inputs the matched texture list signal 39 to calculate the amount of correction so that the pair of corresponding texture data match each other as much as possible. The calculated amount of correction is outputted as a texture correction signal 40 to the texture correcting section 236.

More specifically, it is assumed that a list of texture data captured by the camera-A 203 is represented by the following formula (11) and a list of texture data captured by the camera-B 204 is represented by the following formula (12):

$$\begin{pmatrix} r_1 & r_2 & & r_n \\ g_1 & g_2 & \cdots & g_n \\ b_1 & b_2 & & b_n \end{pmatrix};\tag{11}$$

and $$\begin{pmatrix} r'_1 & r'_2 & & r'_n \\ g'_1 & g'_2 & \cdots & g'_n \\ b'_1 & b'_2 & & b'_n \end{pmatrix}.\tag{12}$$

In the formulae (11) and (12), ${}^t(r_i, g_i, b_i)$ and ${}^t(r'_i, g'_i, b'_i)$ are a pair of i-th texture data, where $1 \leq i \leq n$ (n is the number of pairs).

Assuming a 3×3 rotation matrix G as correction of texture data, G is determined so as to minimize a cost function E(G) defined by the following equation (13):

$$E(G) = \left[ \begin{pmatrix} r_1 & r_2 & & r_n \\ g_1 & g_2 & \cdots & g_n \\ b_1 & b_2 & & b_n \end{pmatrix} - G \begin{pmatrix} r'_1 & r'_2 & & r'_n \\ g'_1 & g'_2 & \cdots & g'_n \\ b'_1 & b'_2 & & b'_n \end{pmatrix} \right]^2.\tag{13}$$

The texture correcting section 236 inputs the texture correction signal 40 and the texture signal B 43 and uses the determined rotation matrix G to convert the texture data captured by the camera-B 204 to output the texture correction signal 41 to the 3-dimensional coordinate and texture image synthesizer 237.

In the second embodiment as described above, a texture image may be captured using a flash or lamp, thereby increasing the quality of a captured texture image. Further, the texture data is corrected in RGB color coordinate system. However, the second embodiment is not limited to the RGB color coordinate system. Another color coordinate system such as YUV color coordinate system may be used. Furthermore, monochrome texture data composed of only brightness may be used in the second embodiment.

It is possible to combine the first embodiment and the second embodiment to allow concurrent correction of both 3-dimensional shape and texture data.

In the first embodiment, the absolute phase determiner A-A/B-A 215 and the absolute phase determiner A-B/B-B 216 determine the corresponding points and therefore the processing of the corresponding pixel calculator 226 and the matched pixel calculator 227 can be performed by the absolute phase determiners A-A/B-A 215 and A-B/B-B 216. Similarly, in the second embodiment, the processing of the corresponding pixel calculator 232 and the matched pixel calculator 233 can be performed by the absolute phase determiner A-A/B-A 215 and A-B/B-B 216.

In the corresponding pixel calculator 226 and the matched pixel calculator 227 or the corresponding pixel calculator 232 and the matched pixel calculator 233, the corresponding pixel searching is performed using image information captured by the respective camera-A 203 and camera-B 204 in the situation that the light pattern is projected by the light projector-A 201. Alternatively, it is also possible that the corresponding pixel searching is performed in the situation that the light pattern is projected by the light projector-B 202 or by both the light projector-A 201 and the light projector-B 202. Further, the present invention may use phase values calculated from an image pattern without directly using an image.

3. Third Embodiment

Figure 10:
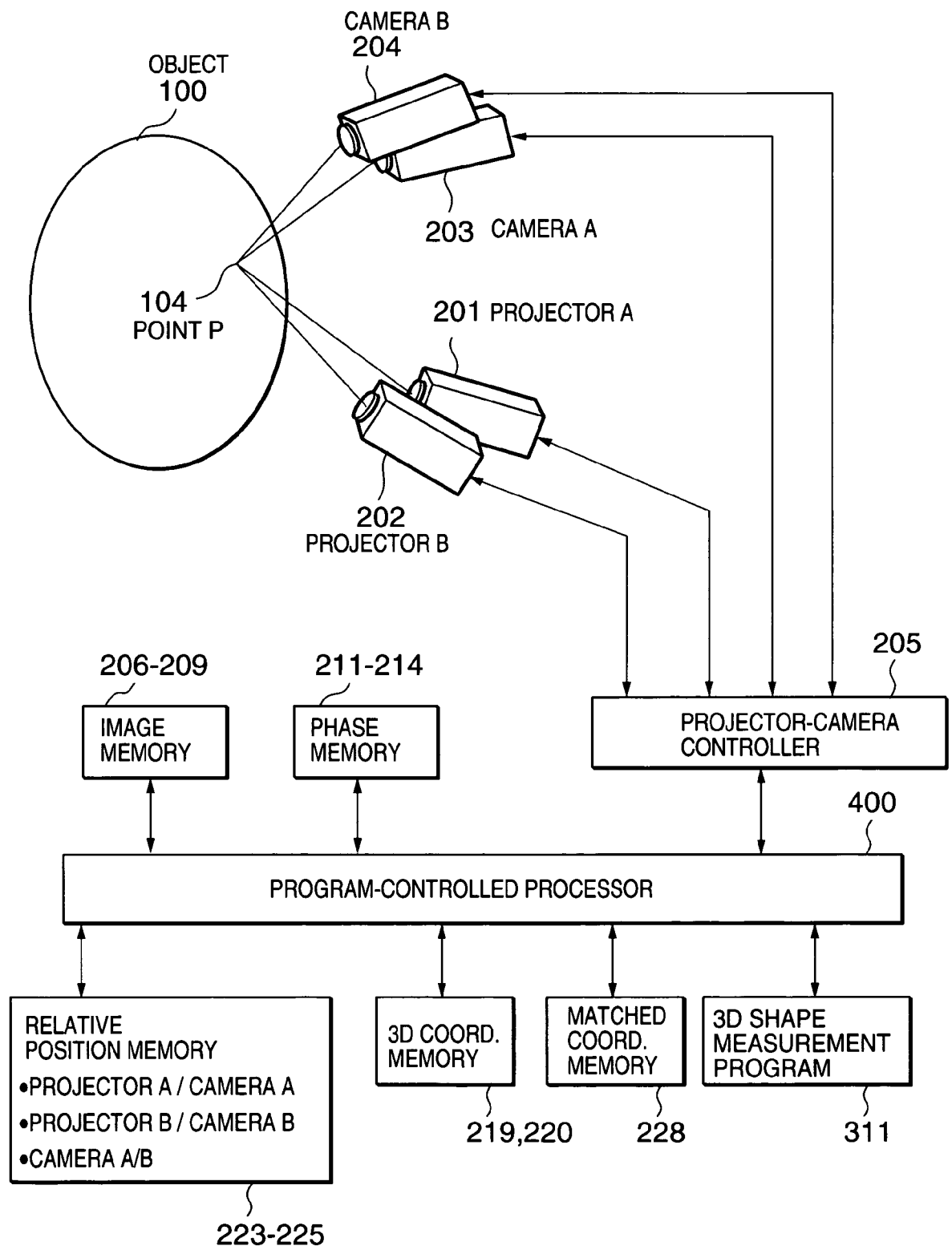
FIG. 10 is a block diagram showing a system including a three-dimensional shape measurement device according to a third embodiment of the present invention.

Referring to FIG. 10, a 3-dimensional shape measurement device according to a third embodiment of the present invention implements the same functions as the first embodiment of FIG. 6 by running a 3-dimensional shape measurement program on a program-controlled processor 400. The 3-dimensional shape measurement program is stored in a memory 11. In FIG. 10, blocks similar to those previously described with reference to FIG. 6 are denoted by the same reference numerals. The operation of the third embodiment is the same as the first embodiment and therefore the descriptions are omitted.

4. Fourth Embodiment

Figure 11:
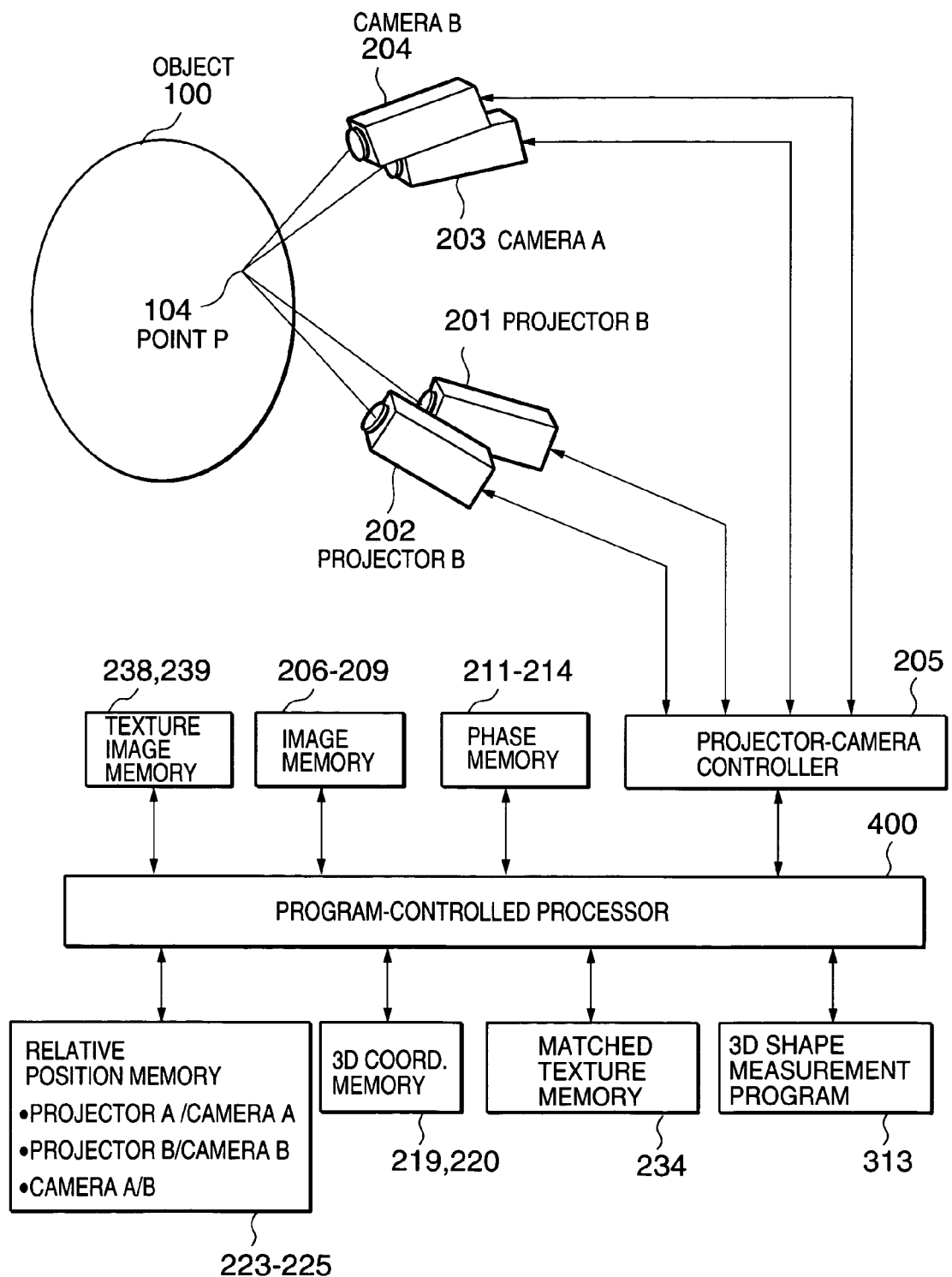
FIG. 11 is a block diagram showing a system including a three-dimensional shape measurement device according to a fourth embodiment of the present invention.

Referring to FIG. 11, a 3-dimensional shape measurement device according to a fourth embodiment of the present invention implements the same functions as the second embodiment of FIG. 9 by running a 3-dimensional shape measurement program on a program controlled processor 400. The 3-dimensional shape measurement program is stored in a memory 313. In FIG. 11, blocks similar to those previously described with reference to FIG. 9 are denoted by the same reference numerals. The operation of the fourth embodiments is the same as the second embodiment and therefore the descriptions are omitted.

The first to fourth embodiments are based on the 3-dimensional shape measurement technique as described in the U.S. Pat. No. 6,421,629. However, the 3-dimensional shape correction section 302 in the first embodiment and the third embodiment may employ another 3-dimensional shape measurement.

In the first to fourth embodiments, two light projectors and two cameras are provided. However, the present invention is not limited to this arrangement. The number of light projectors may be one or more and the number of cameras may be two or more.

The invention claimed is:

1. A method for measuring a three-dimensional appearance of an object, comprising the steps of:
   a) capturing a plurality of images of said object from different points of view, wherein a light pattern is projected onto the object from at least one position;
   b) measuring a three-dimensional in-sight appearance of said object based on said plurality of images at each of said views;
   c) calculating a correcting function to be applied to one of said three-dimensional in-sight appearances at one of said views to thereby minimize discontinuities between one of said three-dimensional in-sight appearances that is different from said one of three-dimensional in-sight appearances and a corrected three-dimensional in-sight appearance that is obtained by correcting said one of three-dimensional in-sight appearances with said correcting function; and
   d) synthesizing the three-dimensional appearance of the object based on said three-dimensional in-sight appearances and said correcting function.

2. The method according to claim 1, wherein the step c) comprises the steps of:
   c.1) mapping a set of target points on one of the plurality of images onto each of the plurality of images other than the one image to produce a set of corresponding points;
   c.2) comparing a captured pattern at each of the target points to captured patterns around each of the corresponding points on the other one image to determine a most matched point for each of the target points to produce a set of most matched points; and
   c.3) minimizing a difference between the set of target points and the set of most matched points to correct a three-dimensional in-sight appearance on the other one image.

3. The method according to claim 1, wherein the light pattern has a periodically varying pattern of intensity.

4. The method according to claim 3, wherein the light pattern has a sinusoidal pattern of intensity.

5. The method according to claim 3, wherein the light pattern has a triangular pattern of intensity.

6. The method according to claim 3, wherein the plurality of images are captured while shifting a phase of the light pattern.

7. A method for measuring a three-dimensional shape of an object, comprising the steps of:
   a) capturing first and second images of said object onto which a light pattern is projected, wherein each of the first and second images is captured from a different point of view;
   b) measuring a three-dimensional shape of said object based on said first and second images captured from a different point of view;
   c) calculating a correcting function to be applied to one of said first and second three-dimensional shapes by obtaining a precise correspondence between the first and second images from captured patterns of the first and second images to thereby minimize discontinuities between one of said positions of the first and second three-dimensional shapes that is different from said one of said positions and a corrected position that is obtained by correcting said one of said positions with said correcting function; and
   d) synthesizing the three-dimensional shape of the object based on said three-dimensional shapes and said correcting function.

8. The method according to claim 7, wherein the step c) comprises the steps of:
   c.1) sequentially selecting a target point from the first image;
   c.2) calculating a corresponding point on the second image, where the corresponding point corresponds to the target point on the first image;
   c.3) searching a predetermined region around the corresponding point on the second image for a matched point providing a captured pattern that most matches a captured pattern at the target point;
   c.4) repeating the steps c.1) to c.3) to produce a target point list of target points and a matched point list of matched points; and c.5) minimizing a difference between the target point list and the matched point list to correct the second three-dimensional shape with respect to the first three-dimensional shape.

9. The method according to claim 7, further comprising the step of:
e) correcting a texture difference between the first and second three-dimensional shapes by obtaining a precise correspondence between the first and second images from captured textures of the first and second images.

10. The method according to claim 9, wherein the step e) comprises the steps of:
e.1) sequentially selecting a target point from the first image;
e.2) calculating a corresponding point on the second image, where the corresponding point corresponds to the target point on the first image;
e.3) searching a predetermined region around the corresponding point on the second image for a matched point providing texture data that most matches texture data at the target point;
e.4) repeating the steps c.1) to c.3) to produce a target texture list of target texture data and a matched texture list of matched texture data; and
e.5) minimizing a difference between the target texture list and the matched texture list to correct the matched texture data of the second three-dimensional shape with respect to the target texture data of the first three-dimensional shape.

11. A method for measuring a three-dimensional shape of an object, comprising the steps of:
a) capturing first and second images of said object onto which a light pattern is projected, wherein each of the first and second images is captured from a different point of view;
b) measuring a three-dimensional shape of said object based on said first and second images captured from a different point of view;
c) calculating a correcting function to be applied to one of said first and second three-dimensional shapes by obtaining a precise correspondence between the first and second images from captured textures of the first and second images to thereby minimize discontinuities between one of said textures of the first and second three-dimensional shapes that is different from said one of said textures and a corrected texture that is obtained by correcting said one of said textures with said correcting function; and
d) synthesizing the three-dimensional shape of the object based on said three-dimensional shapes and said correcting function.

12. The method according to claim 11, wherein the step c) comprises the steps of:
c.1) sequentially selecting a target point from the first image;
c.2) calculating a corresponding point on the second image, where the corresponding point corresponds to the target point on the first image;
c.3) searching a predetermined region around the corresponding point on the second image for a matched point providing texture data that most matches texture data at the target point;
c.4) repeating the steps c.1) to c.3) to produce a target texture list of target texture data and a matched texture list of matched texture data; and
c.5) minimizing a difference between the target texture list and the matched texture list to correct the matched texture data of the second three-dimensional shape with respect to the target texture data of the first three-dimensional shape.

13. A device for measuring a three-dimensional appearance of an object, comprising:
a plurality of cameras for capturing a plurality of images of the object from different points of view, wherein a light pattern is projected onto said object from at least one position;
a three-dimensional appearance calculator for measuring a three-dimensional in-sight appearance of said object based on said plurality of images at each of said views;
a corrector for calculating a correcting function to be applied to one of said three-dimensional in-sight appearances to thereby minimize discontinuities between one of said three-dimensional in-sight appearances that is different from said one of three-dimensional in-sight appearances and a corrected three-dimensional in-sight appearance that is obtained by correcting said one of three-dimensional in-sight appearances with said correcting function; and
a synthesizer for synthesizing the three-dimensional appearance of the object based on said three-dimensional in-sight appearances and said correcting function.

14. The device according to claim 13, wherein the corrector comprises:
a correspondence calculator for mapping a set of target points on one of the plurality of images onto each of the plurality of images other than the one image to produce a set of corresponding points;
a comparator for comparing a captured pattern at each of the target points to captured patterns around each of the corresponding points on the other one image to determine a most matched point for each of the target points to produce a set of most matched points; and
a correction value calculator for minimizing a difference between the set of target points and the set of most matched points to correct a three-dimensional in-sight appearance on the other one image.

15. A device for measuring a three-dimensional shape of an object, comprising:
first and second cameras for capturing first and second images of the object onto which a light pattern is projected, wherein each of the first and second cameras is directed to said object in a different direction;
a three-dimensional shape calculator for measuring a three-dimensional shape of said object based on said first and second images captured from a different point of view;
a position difference corrector for calculating a correcting function to be applied to one of said first and second three-dimensional shapes by obtaining a precise correspondence between the first and second images from captured patterns of the first and second images to thereby minimize discontinuities between one of said positions of the first and second three-dimensional shapes that is different from said one of said positions and a corrected position that is obtained by correcting said one of said positions with said correcting function; and
a synthesizer for synthesizing the three-dimensional shape of the object based on said three-dimensional shapes and said correcting function.

16. The device according to claim 15, further comprising:
a texture difference corrector for correcting a texture difference between the first and second three-dimensional shapes by obtaining a precise correspondence between the first and second images from captured textures of the first and second images.

17. A device for measuring a three-dimensional shape of an object, comprising:
first and second cameras for capturing first and second images of said object onto which a light pattern is projected, wherein each of the first and second images is captured from a different point of view;
a three-dimensional shape calculator for measuring a three-dimensional shape of said object based on said first and second images captured from a different point of view;
a texture difference corrector for calculating a correcting function to be applied to one of said first and second three-dimensional shapes by obtaining a precise correspondence between the first and second images from captured textures of the first and second images to thereby minimize discontinuities between one of said textures of the first and second three-dimensional shapes that is different from said one of said textures and a corrected texture that is obtained by correcting said one of said textures with said correcting function; and
a synthesizer for synthesizing the three-dimensional shape of the object based on said three-dimensional shapes and said correcting function.

18. A computer system comprising:
at least one light projector for projecting a light pattern onto an object;
a plurality of cameras for capturing a plurality of images of an object from different points of view; and
a program-controlled processor executing a program including the steps of:
a) capturing a plurality of images of the object from different points of view;
b) measuring a three-dimensional in-sight appearance of said object based on said plurality of images at each of said views;
c) calculating a correcting function to be applied to one of said three-dimensional in-sight appearances to thereby minimize discontinuities between one of said three-dimensional in-sight appearances that is different from said one of three-dimensional in-sight appearances and a corrected three-dimensional in-sight appearance that is obtained by correcting said one of three-dimensional in-sight appearances with said correcting function; and
d) synthesizing the three-dimensional appearance of the object based on said three-dimensional in-sight appearances and said correcting function.

19. The computer system according to claim 18, wherein the step c) comprises the steps of:

c.1) mapping a set of target points on one of the plurality of images onto each of the plurality of images other than the one image to produce a set of corresponding points;
c.2) comparing a captured pattern at each of the target points to captured patterns around each of the corresponding points on the other one image to determine a most matched point for each of the target points to produce a set of most matched points; and
c.3) minimizing a difference between the set of target points and the set of most matched points to correct a three-dimensional in-sight appearance on the other one image.

20. A computer readable medium containing a program instructing a computer to measure a three-dimensional appearance of an object, the program, when executed, causing the computer to execute the steps of:
a) capturing a plurality of images of the object from different points of view, wherein a light pattern is projected onto the object from at least one position;
b) measuring a three-dimensional in-sight appearance of said object based on said plurality of images at each of said views;
c) calculating a correcting function to be applied to one of said three-dimensional in-sight appearances to thereby minimize discontinuities between one of said three-dimensional in-sight appearances that is different from said one of three-dimensional in-sight appearances and a corrected three-dimensional in-sight appearance that is obtained by correcting said one of three-dimensional in-sight appearances with said correcting function; and
d) synthesizing the three-dimensional appearance of the object based on said three-dimensional in-sight appearances and said correcting function.

21. The computer readable medium according to claim 20, wherein the step c) comprises the steps of:
c.1) mapping a set of target points on one of the plurality of images onto each of the plurality of images other than the one image to produce a set of corresponding points;
c.2) comparing a captured pattern at each of the target points to captured patterns around each of the corresponding points on the other one image to determine a most matched point for each of the target points to produce a set of most matched points; and
c.3) minimizing a difference between the set of target points and the set of most matched points to correct a three-dimensional in-sight appearance on the other one image.

* * * * *